United States Patent [19]

Schinazi

[11] Patent Number: 5,573,335
[45] Date of Patent: Nov. 12, 1996

[54] THIN FILM TEMPERATURE SENSING DEVICE FOR MEASURING THE OPERATING TEMPERATURE OF A CUTTING TOOL

[76] Inventor: Robert Schinazi, 750 Hunter Mill Rd., Apt. 9300e, Blacksburg, Va. 24060

[21] Appl. No.: 248,733

[22] Filed: May 25, 1994

[51] Int. Cl.$^6$ .......................... G01K 1/14; G01K 13/00; B26D 5/00; B23Q 17/09
[52] U.S. Cl. .......................... 374/141; 374/166; 374/179; 374/183; 83/72; 82/900; 82/173; 73/104; 408/16; 409/136
[58] Field of Search .......................... 374/141, 183, 374/166, 179; 82/173, 900; 73/104; 83/72; 407/120; 408/16; 409/136

[56] References Cited

U.S. PATENT DOCUMENTS

| | | | |
|---|---|---|---|
| 5,022,295 | 6/1991 | Stemmler | 83/72 |
| 5,176,053 | 1/1993 | Alvelid et al. | 374/141 |
| 5,302,781 | 4/1994 | Hanson, III | 181/102 |
| 5,429,163 | 7/1995 | Frenkel et al. | 83/16 |

OTHER PUBLICATIONS

Kredier, Kenneth G., "Thin Film Thermocouples For Internal Combustion Engines" J. Vac. Sci. Technol. A4(b), pp. 2618–2623, Nov./Dec. 1986.

Kreider, Kenneth G., "Thin–Film Transparent Thermocouples," Sensors And Actuators A. 34 (1992), pp. 95–99.

Yust, M., and Kreider, K., "Transparent Thin Film Thermocouple," Thin Solid Films, 176 (1989), pp. 73–78.

Kreider, Kenneth G. and Semancik, Stephen, "Thermal and Sputtered Aluminum Oxide Coatings For High Temperature Electrical Insulation," J. Vac. Sci. Technol. A3(b), pp. 2582–2587, Nov./Dec. 1985.

Charles, E. Lorival, R., Boyer, A., and Malbrunot, P., "A Fast–Response High–Temperature High–Pressure Surface Thermocouple," Sensors and Actuators, 6 (1984), pp. 135–142.

Cools, M., "Temperature Measurements Upon The Chisel Surface During Rock Cutting," Int. J. Rock Mech. Min. Sci. & Geomec. Abstr., vol. 30, No. 1, pp. 25–35, 1993.

Tay, A. and Lee, K., "Calculation Of Temperature Distributions In Machining Using A Hybrid Finite–Element–Boundary–Element Method," Journal Of Materials Pressing Technology, 29 (1992), pp. 47–62.

Kuo, T., Flattery, J., Ghosh, P., and Kornreich, P., "Thin–Film Thermocouple Gauge," J. Vac. Sci. Technol. A6(3), May/Jun. 1988, pp. 1150–1152.

Burgess D., Yust, M., and Kreider, K., "Transient Thermal Response Of Plasma–Sprayed Zirconia Measured With Thin–Film Thermocouples," Sensors and Actuators A, 24 (1990), pp. 155–161.

Windischmann, H., "Intrinsic Stress In Sputter–Deposited Thin Films," Critical Reviews In Solid State And Materials Sciences, 17(6) (1992), pp. 547–596.

Stephenson, D., "Tool–Work Thermocouple Temperature Measurements: Theory And Implementation Issues," Sensors And Signal Processing For Manufacturing, PED–Vol. 55, ASME 1992, pp. 81'95.

(List continued on next page.)

Primary Examiner—Diego F. F. Gutierrez
Attorney, Agent, or Firm—Dority & Manning

[57] ABSTRACT

A direct temperature sensing tool directly senses and provides feedback of the temperature of its cutting environment. The tool comprises a base body defining at least one cutting edge of the tool. A protective coating surrounds the base body and the cutting edge, the protective coating providing a friction-reducing surface for the tool. A thin film temperature sensing device, such as a thermocouple device, is disposed on the base body at a distance from the cutting edge. The temperature sensing device is encapsulated within the protective coating. An electrical connection is defined through the protective coating in electrical communication with the temperature sensing device. The tool is configurable with a machine tool so that the temperature sensing device is in communication with a conversion device of the machine tool for providing an indication of the temperature sensed by the temperature sensing device.

31 Claims, 10 Drawing Sheets

OTHER PUBLICATIONS

Sadik, M. and Lindstrom, B., "The Role Of Tool–Chip Contact Length In Metal Cutting," Royal Institute Of Technology, Department Of Production Engineering, 1993, pp. 613–627.

Morel, T., et al., "Heat Transfer In A Cooled And An Insulated Diesel Engine," Sae Paper 890572, Sae Congress, Detroit (No Date).

THIN FILM TEMPERATURE SENSING DEVICE FOR MEASURING THE OPERATING TEMPERATURE OF A CUTTING TOOL

BACKGROUND OF THE INVENTION

The present invention relates to a thin film temperature sensing device, for example a thin film thermocouple, which can be readily incorporated into a cutting tool.

With traditional machining operations, a significant amount of heat is generated during the process of cutting a material ("work piece") with a cutting tool. The majority of the heat produced that goes into the cutting tool is due to friction between a chip which is produced by the cutting tool and the top of the cutting tool. A small amount of heat due to friction is also generated between the tip of the cutting tool and the work piece. Thus, typically the hottest spot ("hot spot") of the working tool is not on the cutting edge of the tool, but at the top of the tool.

The heat generated is an important limiting factor with conventional machine tools. The heat can raise the temperature of the cutting tool to a point where the tool's mechanical and material characteristics become undesirable for cutting. For example, there is a critical temperature for the tool above which there is a rapid decrease in mechanical strength. The life of the cutting tool is defined as the period of time for which the tool can cut at a desired rate and produce a desired quality. Both of these quantities are dependent on the sharpness of the tool. Tool sharpness decreases as the frictional wear on the tool progresses. Tool degradation, or wear, occurs more rapidly as the temperature of the tool increases.

It has become increasingly important in the field to produce and develop cutting tools that can survive at higher cutting rates. Thus, designers have been developing new materials for cutting tools that can survive the higher temperatures produced at the desired higher cutting rates. For example, the evolution of the cutting tool has progressed from tool steel, to high speed steel (HSS), to cast alloys, to cemented carbides, to ceramics, and to diamond. HSS is the most widely used material because it is the strongest of the cutting materials, and therefore the most rugged.

It has also become increasingly popular in the industry to coat cutting tools with a thin ceramic coating to provide a hard, non-reactive, and smooth surface. The thin ceramic coatings are not as brittle as their solid counter-parts and provide increased benefits in hardness and smoothness. These coatings have greatly improved the wear resistance of tools.

Although single coating of cutting tools is the most commonly accepted practice today, multiple coating of the tools is gaining wider acceptance. The additional coatings in essence provide a battery of multiple thermal boundaries at the interfaces between the coatings. The temperature drops several degrees across each interface. If multiple coatings are used, the effect is cumulative and the net result is a very effective thin thermal insulation for the cutting tool. These multiple coatings have been successfully used to increase the cutting rates of the tools.

While tool designers have been developing new materials and coatings to improve productivity, machine designers have been developing computer control systems that allow the cutting operations to occur at optimal conditions. The two most common computer technologies are CNC control and statistical tool control. CNC control allows the operator to specify the cutting parameters through a series of numbers that can be stored in a computer file. Each time the file is accessed and executed, the computer will cause the machine to cut exactly the same way. Ideally, one would identify the set of numbers that would allow optimal cutting to occur, but in fact most manufacturing occurs at only 20 to 80 percent of optimal capacity. The optimal parameters for a part with complex and variable geometry are difficult to determine.

CNC Technology is static in that the cutting parameters do not change during execution of the program file. The specified parameters are based on a presumption that the tool's characteristics will not change. However, this presumption generally is not true. Tools tend to dull and their cutting characteristics will vary over time. In order to compensate for these variations, one could write an equation into the file program to estimate the changes, or develop a sensor to track conditions indicative of the changes. Thus, a sensing system which would allow an operator or computer to dynamically monitor the variation in conditions would be a significant advancement in the industry.

Statistical tool control is based on the concept that if you cut exactly the same way each time, a cutting tool will last on average the same period of time. Manufacturers typically collect the cutting life of several dozen tools that cut the same family of parts to determine the statistical average tool life. However, two major problems exist in this method. There is a significant amount of variability in the life of each tool and the statistical average is based on a high survival rate. Unfortunately, some tools have much shorter lives than others which significantly impacts upon the variability and statistical average. Since the cost of having the tool fail while in operation generally far exceeds the cost of replacing the tool before failure, the manufacturers replace the tools based on the shortest cutting tool life.

As a result, most manufacturing today is operating at far below optimal conditions. This problem is acutely pronounced in modern high speed cutting systems. High speed cutting systems offer greater productivity, but put the cutting tool at higher risk of temperature damage. Thus, manufacturers intentionally program the CNC machine to operate at speeds below optimal. Thus, ideally one would desire a measurement or indication that can be correlated to the optimal cutting conditions of the tool and that can be used as feedback for controlling the feed rates and speeds of the cutting process. Temperature of the cutting tool is such an indication.

Direct measurement of the cutting tool temperature is preferred and several attempts have been made in this regard. Unfortunately, direct measurement of the cutting tool temperature is complicated by a number of factors. For example, the use of coolant, the sheer abrasion of the removed chips, and a sharp temperature gradient within the cutting tool are examples of such factors. The use of coolant obstructs the cutting edge from view and renders non-contact temperature measurement techniques, such as infrared optical pyrometery, extremely difficult. Additionally, the use of coolant makes the temperature gradient sharper and less predictable since the flow of coolant is not necessarily uniform and the flow rate is not constant. Other direct measuring techniques such as placing a temperature sensor on top of the cutting tool are ineffective because the abrasion of metal chips literally pushes the device off of the tool. Indirect measuring techniques have been suggested but, these techniques have failed to provide the necessary responsiveness needed for computer control, nor the ruggedness needed to survive the cutting process.

Thin film thermocouple sensors have been developed and used in industry in various applications. For example, the scholarly article entitled "Thermal and Sputtered Aluminum Oxide Coatings for High Temperature Electrical Insulation," by Kenneth G. Kreider and Stephen Semancik, J. Vac. Sco. Technol. A3(6), November/December 1985, describes the use of thin film sensors to provide temperature measurements of critical areas of turbine engine blades and vanes. The article "Thin Film Thermocouples for Internal Combustion Engines," by Kenneth G. Kreider; J. Vac. Sco. Technol. A4(6), November/December 1986, describes the use of such devices for thermometry of internal combustion engine parts including valves, valve seats, combustion chamber walls, and piston heads. However, conventional applications of thin film sensors have been in non-abrasive environments. Typically, thin film thermocouples have been considered as relatively delicate device and not suitable for a physically abusive environment, such as with cutting tools.

OBJECTS AND SUMMARY OF THE INVENTION

It is a principal object of the present invention to provide a temperature sensing device for directly measuring the temperature of a cutting tool.

Another object of the present invention is to provide a temperature sensing device which can be located directly on the hot spot of a cutting tool without interfering with operation of the tool or being dislodged from the tool.

A still further object of the present invention is to provide a temperature sensing device for use on cutting tools which has an extremely fast and accurate response time and which may be encapsulated into pre-existing conventional coatings for tools.

And yet a further object of the present invention is to provide a thin film temperature sensing device for use on cutting tools which is ideally suited for computer control.

Still a further object of the present invention is to provide a temperature sensing device for cutting tools which allows manufacturing to operate much closer to optimum cutting rates and to achieve tighter control of tolerances and surface quality.

Another object of the present invention is to provide a temperature sensing device for tools which will provide for more accurate evaluation and predictability of the tool life and cutting characteristics.

And still a further object of the present invention is to provide direct feedback from a tool which will allow an operator or computer program to optimize use of the tool to gain improved tolerances and surface finish from the tool.

Additional objects and advantages of the invention will be set forth in part in the following description and in part will be obvious from the description, or may be learned by practice of the invention.

In accordance with the objects of the invention, a direct temperature sensing cutting tool is provided for use with a machine tool. The cutting tool directly senses and provides feedback of the temperature of its cutting environment. The cutting tool comprises a base body which defines at least one cutting edge or working surface of the cutting tool. At least a first protective coating generally surrounds the base body. The protective coating provides a friction reducing surface for the cutting tool. In a preferred embodiment, the protective coating covers all of the surfaces of the tool, including the cutting edges. A thin film temperature sensing device is disposed on the base body at a distance from the cutting edge. The temperature sensing device is encapsulated within the protective coating. An electrical connection is defined through the protective coating in electrical communication with the sensing device. The cutting tool is configurable with a machine tool so that the temperature sensing device is in communication with a conversion device, such as the machine's computer, of the machine tool for providing an indication of the temperature sensed by the temperature sensing device.

The cutting tool according to the invention comprises any number of preferred embodiments. For example, the cutting tool may comprise a cutting insert for use with a lathe. Alternatively, the cutting tool may comprise a cutting insert for use with a milling machine. Likewise, the tool may comprise an end mill for use with a milling machine. Similarly, the cutting tool may comprise a drill bit for use with a drilling machine. In an alternative preferred embodiment, the cutting tool may comprise a wood-working tool for use with a wood-working machine, such as a saw blade for use with a saw.

In yet another preferred embodiment of the invention, the tool comprises a plurality of the temperature sensing devices, with each said temperature sensing device having an individual electrical connection isolated from the other electrical connections.

Preferably, the temperature sensing device according to the invention comprises a thin film thermocouple, but may comprise, for example, a semi-conducting temperature sensor or a resistance temperature device. The thin film thermocouple comprises a conductive base, an insulating film formed over the conductive base, a conductive metal film formed over the insulating film, and a thermocouple junction defined through the insulating film between the conductive base and the conductive metal film. In this embodiment, the protective coating comprises an electrically insulating material which is disposed over the conductive metal film. The base body of the tool itself may comprise a conductive material and constitute the conductive base. In an embodiment where the base body is formed of a non-conductive material, the conductive base comprises a metal coating over the non-conductive base body.

In an alternative embodiment of the invention, a second protective coating is provided covering the first protective coating. For example, if the temperature sensing device is a thin film thermocouple, the protective coating must comprise essentially a non-conductive material for electrically insulating the conductive film layer of the thermocouple. In this embodiment, it may be desirable to add an additional protective coating, such as titanium nitride, over the electrically insulating protective coating. If the electrically insulating coating does not cover the cutting or working edges of the tool, it may be preferred to cover these edges with the second protective coating. Alternatively, both the first and second protective coatings may cover the working or cutting edges.

Preferably, the cutting tool is configured as a cutting insert having a plurality of cutting edges, with the base body comprising a first face and an opposite second face with at least one thermocouple defined in a section of each face. The electrical connection includes a contact point defined through the protective coating at each face in electrical communication with the conductive metal film. The electrical connection also comprises a contact point for each thermocouple to the conductive base. This contact point to the conductive base may comprise a common point. Preferably, the contact point to the conductive base comprises a securing device configured to secure the cutting tool to the tool holder, such as a locking screw and nut. Preferably, the conversion device of the machine comprises a computer, and preferably the existing machine computer, with the electrical connections being in communication with the computer for conveying an electrical signal to the computer correlating to the temperature sensed by the device. Alternatively, a separate computer or conversion device may be included with the machine for converting the electrical signal from the sensing device.

DETAILED DESCRIPTION OF THE PREFERRED EMBODIMENTS

Reference now will be made in detail to the presently preferred embodiments of the invention. One or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For example, features illustrated or described as part of one embodiment can be used on another embodiment to yield a still further embodiment. Thus, it is intended that the present invention cover such modifications and variations as come within the scope of the appended claims and their equivalents. The numbering of components in the drawings is consistent throughout the application, with the same components having the same number in each of the drawings.

Figure 1:
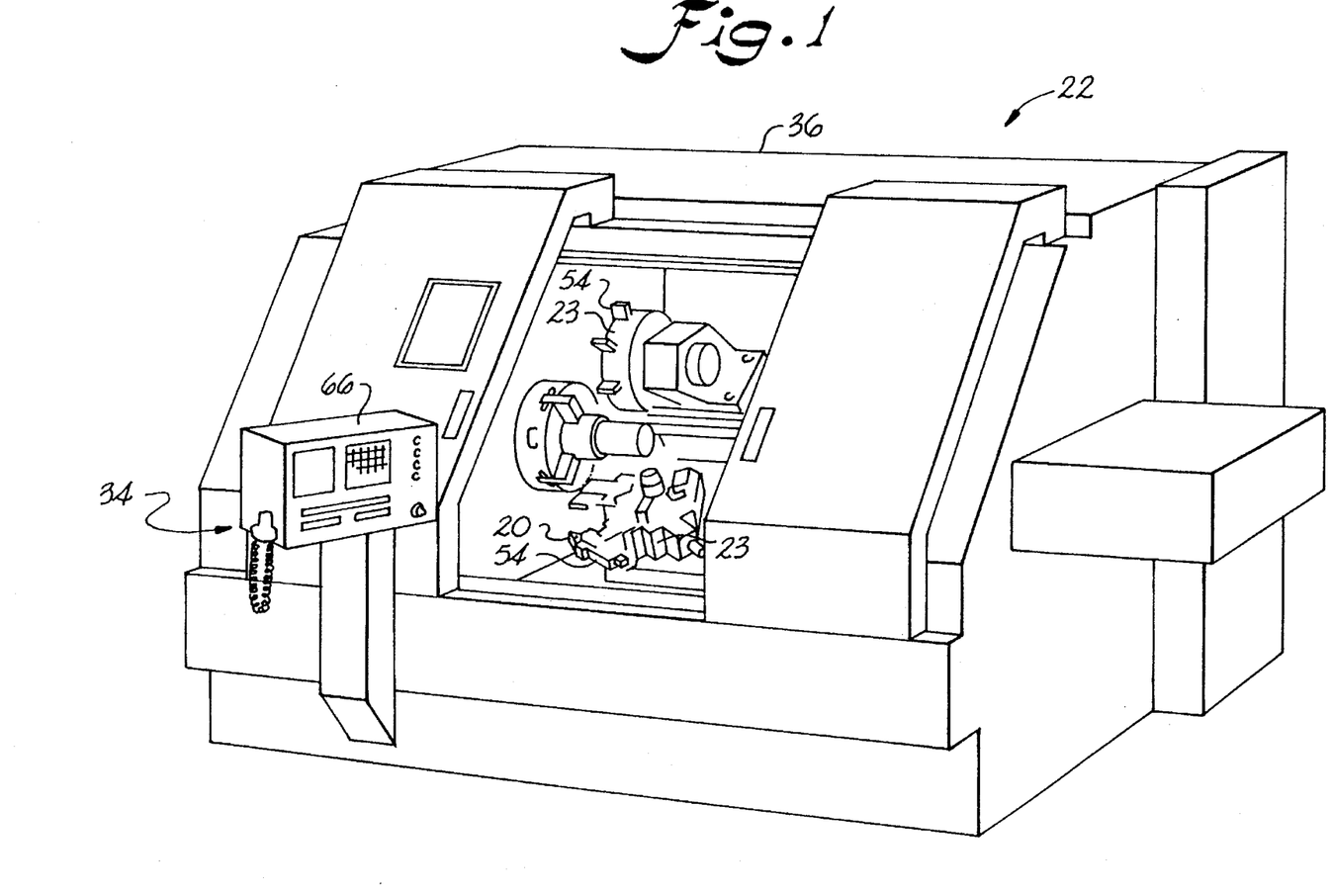
FIG. 1 is an illustration of the present invention with a conventional CNC lathe machine.

According to the invention, a direct temperature sensing cutting tool is provided. The cutting tool is capable of directly sensing and providing feedback of temperature of its cutting environment. The present invention is not limited to any particular type of cutting tool. For example, the invention may include embodiments of cutting inserts, end mills, drill bits, routers, shapers, saw blades, and any manner of tool wherein heat is generated between the tool and a work piece. An example of an embodiment of the invention is generally illustrated in FIG. 1. FIG. 1 depicts a lathe 36 with turrets 23. As commonly understood by those skilled in the art, turrets 23 include removable tool holders 54, which further include at least one cutting tool insert 20. The operation and configuration of such a lathe is well understood and need not be described herein. Lathe 36 also includes a conversion device 34, which may constitute a computer 66, for converting the electrical signals from cutting tool 20 into readable temperature indications of the cutting environment of the tool, as will be described in greater detail below. For ease of explanation and illustration, the invention will be referred to and described generally as it relates to cutting inserts or end mills. However, it should be understood that this is not a limitation of the invention. It is within the scope and spirit of the invention to incorporate the direct temperature sensing apparatus of the invention with any manner of tool wherein heat generated between the tool and a work piece is a critical limiting factor of the tool, for example as with wood working machinery.

Figure 2:
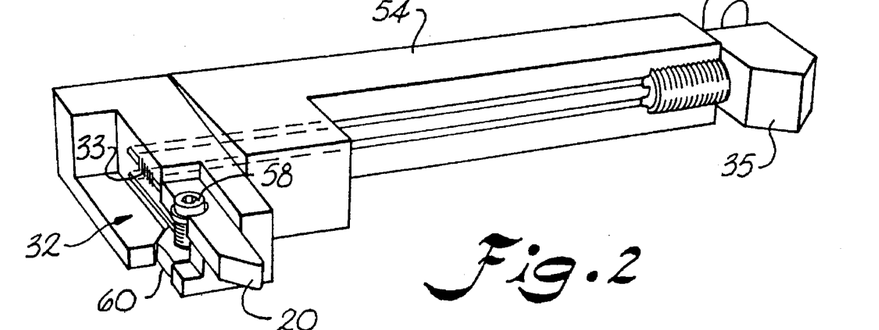
FIG. 2 is a partial cut-away component view of the cutting insert used in the machine of FIG. 1.

FIG. 2 particularly illustrates the tool holder 54 of lathe machine 36. Tool holder 54 includes a connector 35 for connecting the electric signal from insert 20 to lathe 36 by means of, for example, a cable attached to turret 23. Cutting insert 20 is held within tool holder 54 by means of a securing nut 60 and locking screw 58. Nut 60 is electrically isolated from the rest of the tool holder. As will be described below, electrical signals are generated by cutting insert 20 which can be converted into a temperature indication or otherwise correlated to the temperature of insert 20. Electrical connection means or pathways 32 must be provided within tool holder 54 which eventually electrically connect with conversion device 34 or computer 66. Computer 66 may comprise the machine's existing computer, or may comprise a separate component particularly configured for converting electrical signals into a temperature readout. These systems are well known conventional systems and not necessarily inventive to the present invention. For example, computing devices or systems are well known for converting electrical signals from a thermocouple into a readable temperature indication. Any such system can be incorporated in the present invention. In a preferred embodiment, electrical connection 32 preferably incorporates contact pins 33 and securing nut 60 within tool holder 54. These contact pins are preferably spring loaded to insure positive contact between the pin and cutting insert 20. It should be understood that this description of tool holder 54 is for purposes of describing the invention and is not meant to limit the invention. For example tool holder 54 may comprise a quick release tool holder, the operation and configuration of which are understood in the art.

The present invention also encompasses various embodiments of thin film temperature sensing devices. For example, the thin film temperature sensing devices may include a semi-conducting temperature sensor. Likewise, the sensing device may comprise a resistance temperature detector (RTD). In a preferred embodiment of the invention, the temperature sensing device comprises a thin film thermocouple, and may be a refractory metal thermocouple. Again, for ease of illustration and explanation, the thin film temperature sensing device will be described generally as a thin film thermocouple. However, it should be understood that, for example, a RTD type sensing device could be exchanged for the thermocouple in any embodiment or explanation of the invention.

Figure 3A:
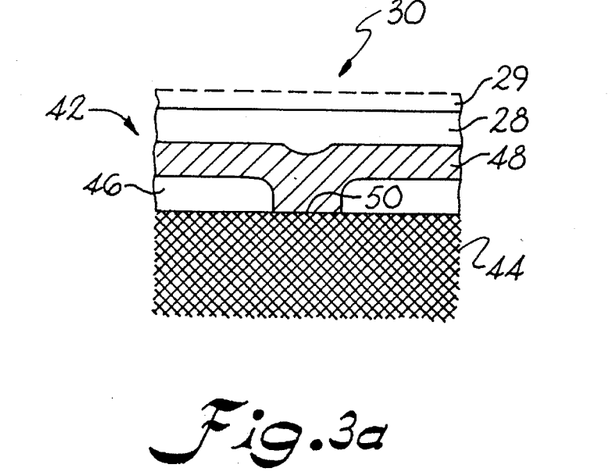
FIGS. 3a and 3b are cross-sectional diagrammatic views of thin film thermocouples formed according to the invention.
Figure 3B:
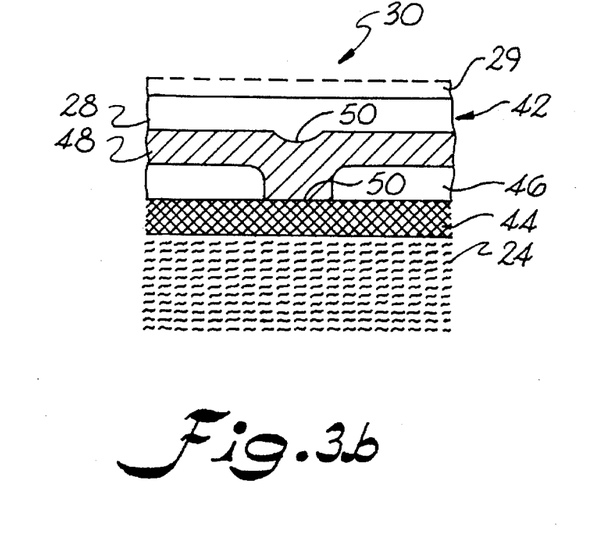

Referring particularly to FIGS. 3a and 3b, the cutting tool according to the invention includes a base body 24. Base body 24 can comprise, for example, any conventional cutting tool or cutting insert and can comprise any conventional material, such as HSS steel, cobalt/tungsten carbide, or nickel-molybdenum/titanium carbide. The base body defines at least one cutting or working edge 26 FIGS. 4a and 5a. As explained in the background section of the application, this cutting or working edge 26 generates chips through engagement with a work piece. These chips generate through friction a significant amount of heat on the cutting insert. As discussed, the hottest temperature of the cutting tool is not necessarily at the cutting edge 26 but at a distance therefrom. Therefore, it is preferred to dispose the thin film temperature sensing device at a distance from the cutting edge 26 so as to detect the hottest part of the tool. This is preferred since wear or tool degradation occurs most rapidly at the hottest part.

A protective coating 28 surrounds base body 24, and cutting edge 26 if desired. Protective coating 28 is electrically insulating and provides a friction reducing surface for the cutting tool. The insulating coating should be hard, non-reactive, and relatively smooth. Various conventional materials may be used as protective coating 28. For example, thin ceramic coatings are used on cutting tools to provide a hard, non-reactive, smooth surface for the tool. By providing a smooth friction reducing surface, the coefficient of friction is reduced thereby decreasing the amount of heat generated at a given speed. Thus, the cutting rate or speed of the tool can be increased. Coating 28 can be produced through a number of processes, such as physical vapor deposition (PVD), chemical vapor deposition (CVD), ion assisted vapor deposition (IAVP), sputtering, and reactive sputtering. The selection of a particular process is dependent on the specific protective coating material used. The objective of the deposition of the material is to produce the most homogeneous, smooth, and well adhered coating possible. The homogeneity and surface smoothness of the coating is directly related to the presence of cracks and defects, and thus to the strength of the coating. In addition to providing electrical and physical protection, coating 28 also serves as an oxygen barrier. One of the main problems associated with the use of metals is that they tend to oxidize at high temperatures. By encapsulating the metal in a non-reactive coating, it is protected from oxidation.

Applicant has found that a preferred protective coating is aluminum oxide. Additionally, in a preferred embodiment, the aluminum oxide protective coating is encapsulated in another protective coating 29, such as titanium nitride, which is not necessarily an electrically insulating material. In this embodiment, the aluminum oxide provides electrical insulation and abrasion resistance while the titanium nitride provides a hard, low-friction surface. Titanium nitride's use and properties are well known in the industry. Although aluminum oxide and titanium nitride have been mentioned, the invention is not limited to these coatings, and any suitable material may be used for protective coating 28 or other additional coatings 29 used in multiple layered embodiments.

The development of a strong interface between the dissimilar materials of base body 24 and coating 28 is facilitated by diffusional bonding. This process involves elevating the temperature of the coated parts to their softening point. The parts are then held at their softened point for several hours while the different layers inter-diffuse to achieve a strong interface. In addition, multiple layers of protective coating may also be utilized. The additional coatings provide a battery of thermal boundaries at the interfaces. Across each of these interfaces, the temperature may drop several degrees. If multiple coatings are used, the effect is cumulative and the net result is a very thin and effective thermal insulation.

The thin film temperature sensing device is encapsulated within protective coating 28. This design provides distinct advantages. The thin film device is encapsulated in the protective coating and is thus protected from chips. The thin film device is located directly on top of the hot spot of the cutting tool so as to detect the hottest temperature. Finally, the thin film device is disposed so as to provide a very fast temperature response. Thus, the design offers direct measurement of temperature while being rugged enough to survive the cutting environment of the tool.

It is preferred that the thin film device be in the sub micron range, preferably from 1 to 6 microns thick. Thus, the thin film device does not provide a mechanical or obtrusive edge for the chips to attack. Additionally, the low mass of the thin film device makes it extremely responsive to temperature. This responsiveness overcomes any masking of temperature from coolant and also makes the device ideally suited for computer control. Real time temperature measurements provided by the sensor allows for much tighter control of tolerances and surface quality from the tool.

Figure 5A:
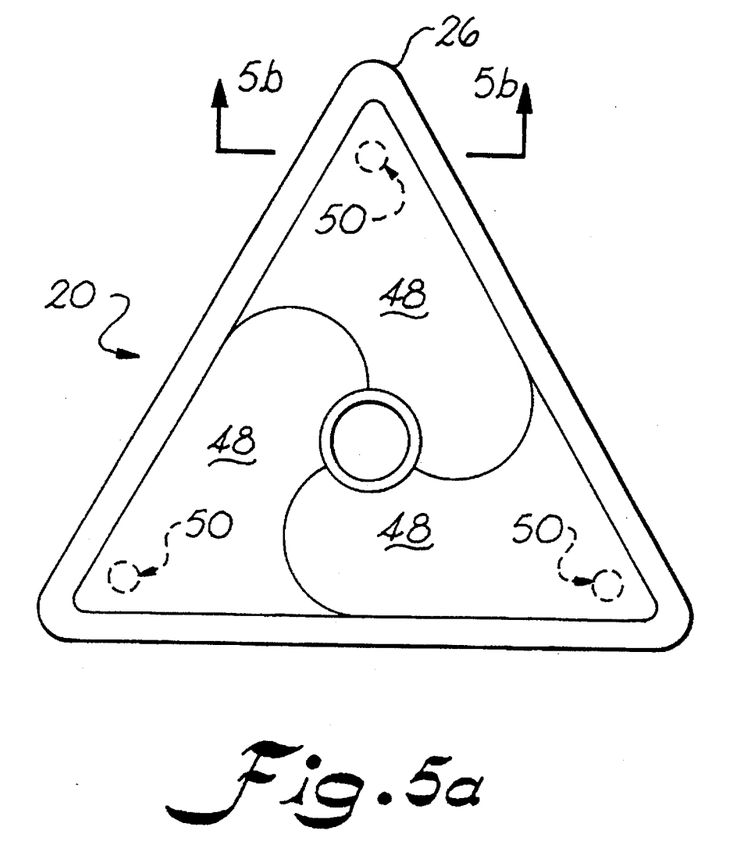
FIG. 5a is a diagrammatic view of the insert shown in FIG. 4a illustrating the second conductive metal film deposited over the insulating film layer.
Figure 5B:
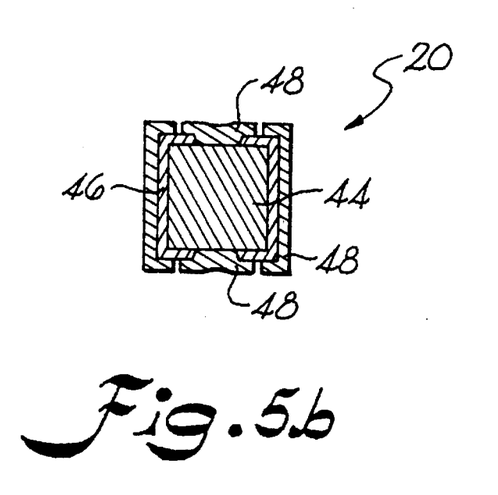
FIG. 5b is a cut-away cross-sectional view of the insert of FIG. 5a taken along the lines indicated.
Figure 6A:
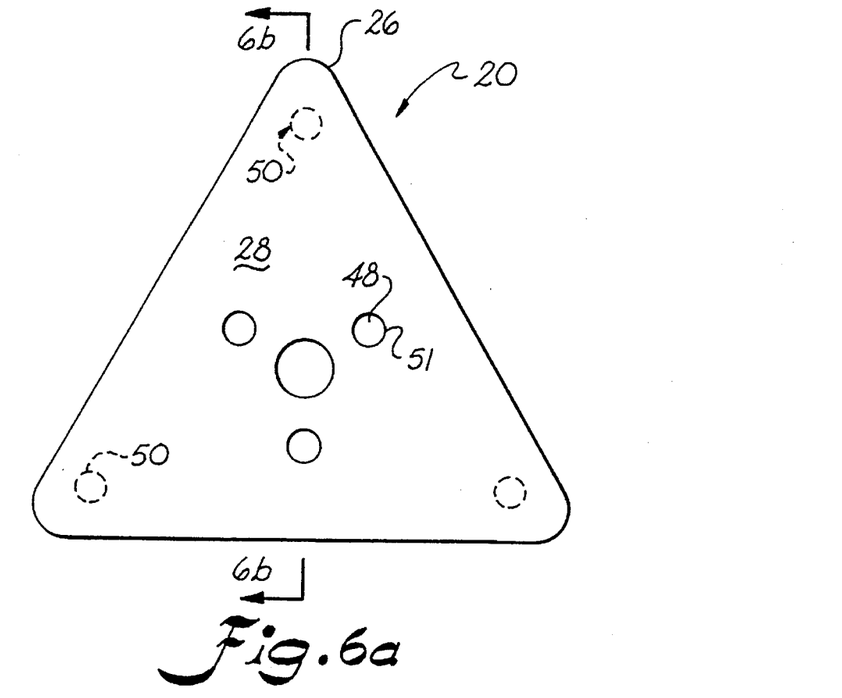
FIG. 6a is a diagrammatic illustration of the cutting insert of FIG. 5a particularly illustrating the protective coating layer disposed over the second conductive metal layer.
Figure 6B:
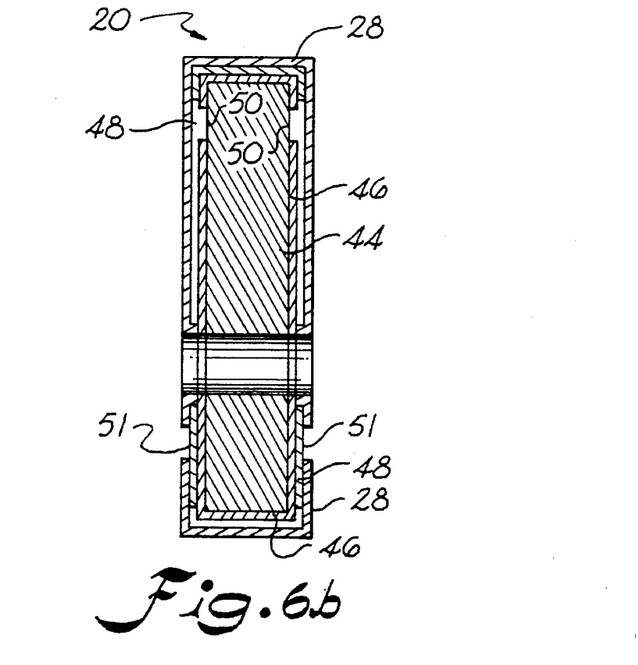
FIG. 6b is a cut-away side view of the insert of FIG. 6a taken along the lines indicated.
Figure 7A:
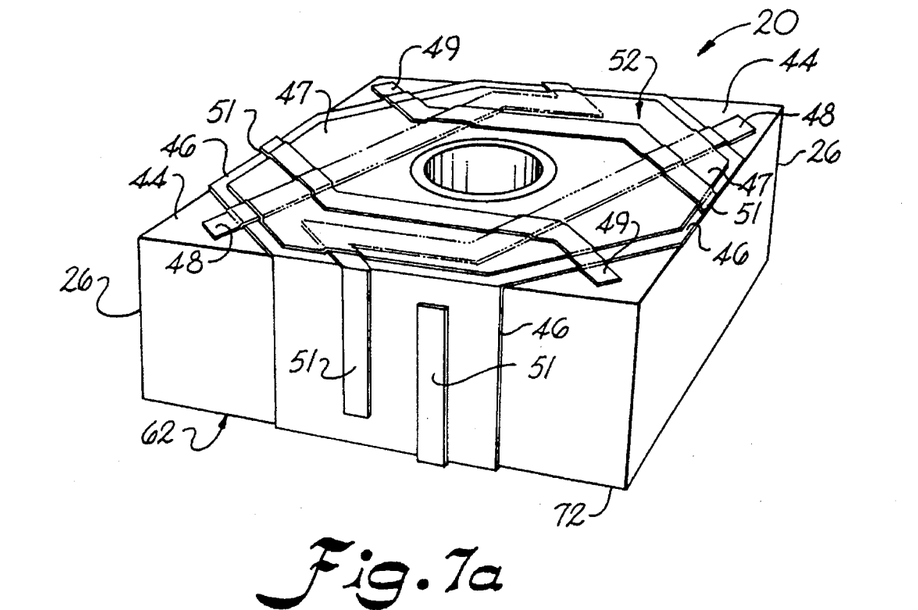
FIGS. 7a and 7b illustrate alternative embodiments of the cutting insert according to the invention particularly illustrating multiple thermocouple junctions and pick-ups.
Figure 7B:
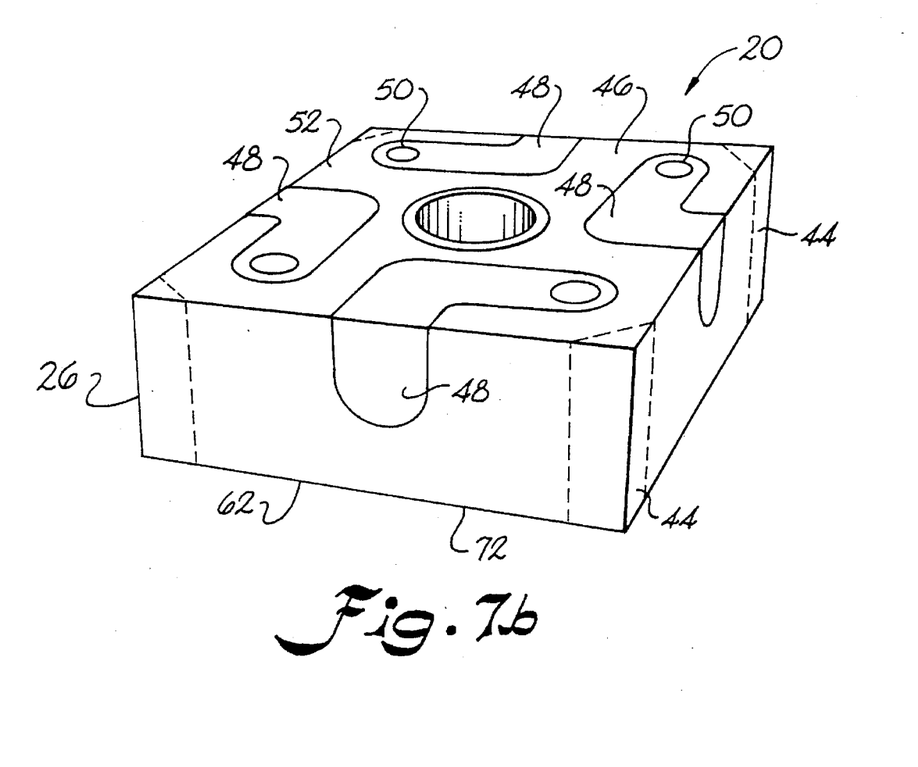

In a preferred embodiment of the invention illustrated in the figures, thin film device 30 comprises a thin film thermocouple 42, as particularly illustrated in FIGS. 3 through 6. Thermocouple 42 comprises multiple coatings which have preferably been selected for their mechanical and electrical properties. The thermocouple is essentially formed in three steps. First, an insulating coating or film 46 is deposited over the tool except on the cutting edge. For ease of manufacture and production, the insulating coating is generally applied over all of the surfaces or opposing faces of the cutting tool. Alternatively, film 46 may be applied only over selected portions or areas of the base body. Next, a conductive metal coating or film 48 is deposited over insulating film 46. Again, conductive film 48 does not cover the cutting edge. Conductive film layer 48 may be selectively deposited in strips by masking, as generally shown in FIG. 7b, or may be deposited as a homogeneous coating then selectively etched or otherwise divided into sections as indicated in FIG. 5a. Before conductive film layer 48 is deposited, a hole or access is buffed, etched, or otherwise formed into insulating coating 46 exposing the conductive base 44 in one or more places. Any number of places may be selected depending on the number of thermocouple junctions 50 desired. In this manner, conductive metal film layer 48 is formed into or fills the buffed or etched hole forming a thermocouple junction 50. Once the thermocouple junctions have been formed, the third step involves overcoating the previous layers or films with protective coating 28 as discussed. Protective coating 28 is formed preferably over the entire device, including the cutting edges. However, protective coating 28 could be designed to cover essentially all of the tool except the cutting edge, in which case a second protective coating such as titanium nitride would preferably be used, as discussed.

Figure 4A:
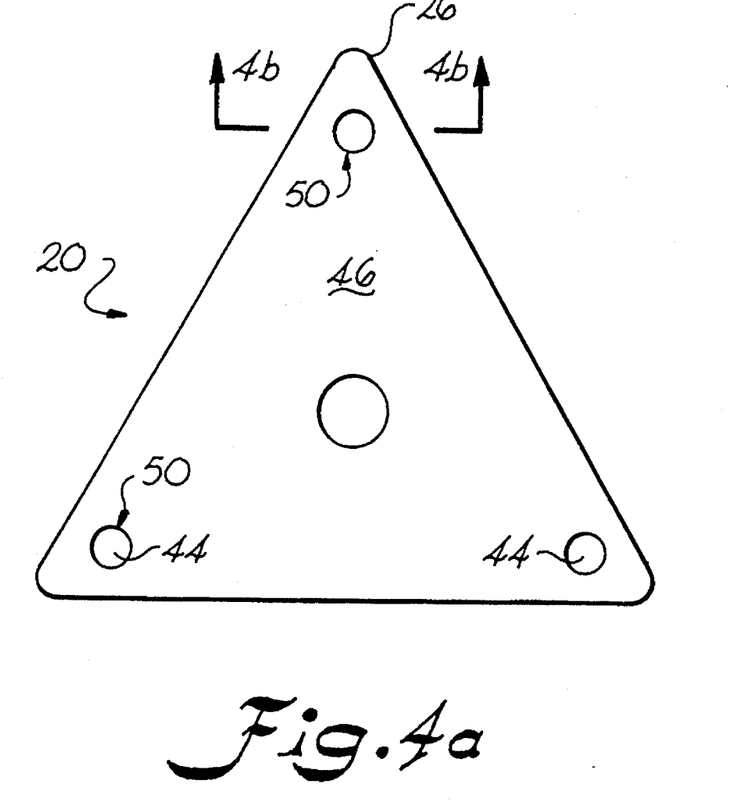
FIG. 4a is a diagrammatic view of a cutting insert coated with the first insulator according to the invention.
Figure 4B:
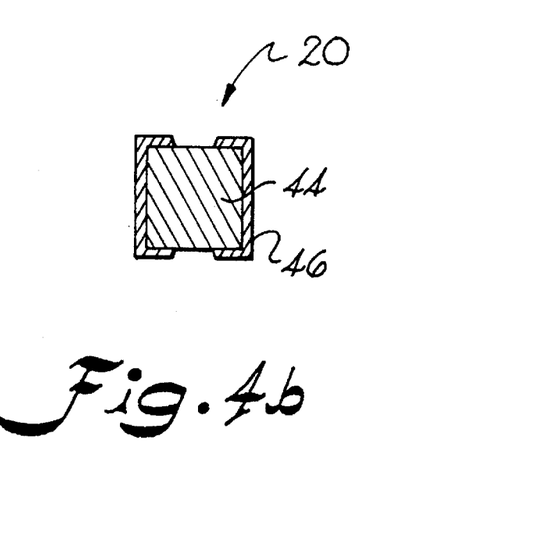
FIG. 4b is a cut-away side view of the insert shown in FIG. 4a taken along the lines indicated.

Contact points must be defined from thermocouple junctions 50 in order to pick up the electric voltages generated at the thermocouple junctions due to temperature differences between the conductive metal film 48 and conductive body 44. Contact points 51 are particularly illustrated in FIGS. 6a and 6b. Contact points 51 comprise an access through protective coating 28 to the conductive metal film layer 48. Contact points 51 can be located at any preferred position, but preferably are located or defined on the sides of the cutting tool, as particularly illustrated in FIGS. 7a and 7b. A contact point 51 is provided for each thermocouple junction 50. An individual contact point is provided for each individual junction 50 so that the only voltage picked up at contact point 51 is due to temperature changes at its associated thermocouple junction 50. If thermocouple junctions 50 were to share a contact point 51, then the accuracy of the temperature detected would be degraded since the temperature profile changes significantly from one cutting edge to the other in a cutting insert having multiple cutting edges when only one such edge is being used. Thus, it should be understood that the thermocouple junctions 50 are disposed so as to provide a measurement for each cutting edge. For example, the cutting inserts or tools 20 illustrated in FIGS. 4 through 6 are triangular in shape and have six cutting edges, three per side. Therefore, three thermocouple junctions are defined generally near the cutting edges but set a distance therefrom.

FIGS. 4a and 4b illustrate the hole or access where thermocouple junctions will be etched or otherwise formed in insulating film layer 46. FIGS. 5a and 5b illustrate the formation or deposition of the conductive metal film layer 48. In this embodiment, the conductive metal film layers 48 for each thermocouple are formed by selectively etching the metal film layer in three distinct regions. Selective etching is a well known process widely used in many industries and is understood and known by those skilled in the art. The regions are separate and distinct so as to prevent interference from adjacent thermocouples. FIGS. 6a and 6a illustrate the finally formed device with protective coating 28 deposited over layers 46 and 48. In this embodiment, the contact points 51 defined through protective coating 28 are formed on the top face of the cutting tool insert 20. However, as mentioned, the contact points 51 may be formed on the sides of the insert 20.

Referring particularly to FIGS. 3a and 3b, the thermocouple junction 50 must be formed between two dissimilar conductive surfaces. Referring particularly to FIG. 3a, the base body of the insert comprises a conductive base 44. In other words, the material forming the base body is itself conductive. However, there may be instances wherein the material of the base body 24 is non-conductive, as shown in FIG. 3b. In this instance a first conductive base material 44 would necessarily be deposited on the non-conductive base body 24. Formation of the remaining layers of the thermocouple would be as described.

The invention may contain any configuration of thermocouple junctions 50 and contact points 51. For example, referring to FIGS. 7a and 7b in particular, the cutting tools or inserts 20 may comprise opposite faces 52 and 62. Thermocouples 42 may be defined or deposited on either of the faces or both faces. Similarly, contact points 51 may be deposited on either or both faces, or on the sides of insert 20. FIG. 7a represents a preferred embodiment of the invention wherein multiple thermocouples have been formed on cutting tool or insert 20 through conventional masking techniques. Four thermocouples per side are illustrated in FIG. 7a, one for each cutting edge 26. Conductive base body 44 is generally exposed at each cutting edge. A first insulating film layer 46 is deposited on conductive base 44 leaving the cutting edges generally exposed. First metal film strips 48 are then deposited over first insulating layer 46. Strips 48 have ends which are deposited onto the conductive base 44 thereby forming a thermocouple junction with conductive base 44. Strips 48 terminate in ends defining contact points 51.

Subsequently, a second insulating film layer 47 is deposited over conductive strips 48. Metal conductive film strips 49 are then laid or deposited on the second insulating film layer 47 and have ends which are in contact with conductive base body 44 at two of the cutting edges, thereby forming thermocouple junctions therewith. Strips 49 cross over first laid strips 48 but are electrically insulated therefrom by way of second insulating layer 47. Strips 49 also end in contact points 51 along the sides of insert 20. The same configuration could exist on the cutting tool on the opposite face not illustrated.

FIG. 7b represents another preferred embodiment of a cutting insert 20 having multiple thermocouple temperature sensing devices. In this embodiment, the conductive strips are etched into a single insulating layer 46 in the form of strips or ribbons. After the conductive layers have been etched, the tool would preferably be coated with the protective coatings, as previously described. Again, the same configuration could be performed on the opposite face 62 of the device.

The invention is not limited to any particular materials. For example, any manner of material may be used as the insulating film layer 46. Applicant has found that aluminum oxide is a particularly suitable insulating layer, but other insulating materials are also available and within the scope of the invention. Likewise, any manner of conducting material may be utilized as conductive metal film 48.

Thermocouple 42 is in electrical communication from its respective contact point 51 with an eventual conversion device for converting the electrical signal or voltage generated at the thermocouple junction into a readable temperature. The technology and equipment for reading thermocouples is well known in the art and any such conventional system or equipment may be incorporated in the invention. Preferably, the conversion device comprises a computer 66 (FIG. 1). As discussed, the present invention is particularly suited for computer controlled machining centers, and the conversion device may simply be incorporated into the machine's computer. However, alternate or peripheral equipment may also be utilized to convert the electrical voltages from the thermocouples into a readable temperature.

Various embodiments and arrangements may be utilized for conducting the electrical voltages from the thermocouples to the conversion devices. An electrical path must be provided for each of the metals forming the thermocouple junctions. In the preferred embodiment, wherein the base body 44 is formed of a conductive material, the contact point for the conductive base body preferably consist of the securing device 56 which secures the insert 20 to the tool holder 54, as particularly illustrated in FIGS. 2 and 10. In these embodiments, the securing device 56 comprises a locking screw and nut 58 and 60. Nut 60 and 58 are in electrical communication with the conductive base 44 and, thus, an electrical pathway 32 is defined from screw 58 or nut 60. Nut 60 must be electrically insulated from the rest of tool holder 54. It is preferred that the screw and nut comprise essentially the same material as the base body so that the accuracy of the thermocouple is not effected by dissimilar metals between the nut and screw and conductive base body. For example, if the base body 44 is essentially cobalt, then screw and nut 58 and 60 should also comprise essentially cobalt or be coated with cobalt.

The electrical connection from pick-up points 51 preferably comprises contact pins 33 preferably formed of the same metal as the conductive metal film. Pins 33 are preferably spring loaded. In this manner, as insert 20 is rotated to expose various cutting edges, the various contact points 51 come into contact with the spring loaded contact pin 33. Pins 33 would necessary be disposed in tool holder 54 wherever is necessary to contact contact points 51. For instance, if contact points 51 were defined on the faces instead of the sides of the cutting insert 20, pins 33 would accordingly be repositioned.

It should be understood that the embodiment using contact pins 33 is but a mere preferred embodiment. Virtually any configuration and combination of electrical connection devices and means may be utilized to provide an electrical pathway from the thermocouples to the conversion devices. Any and all such configurations are within the scope and spirit of the invention.

Figure 8:
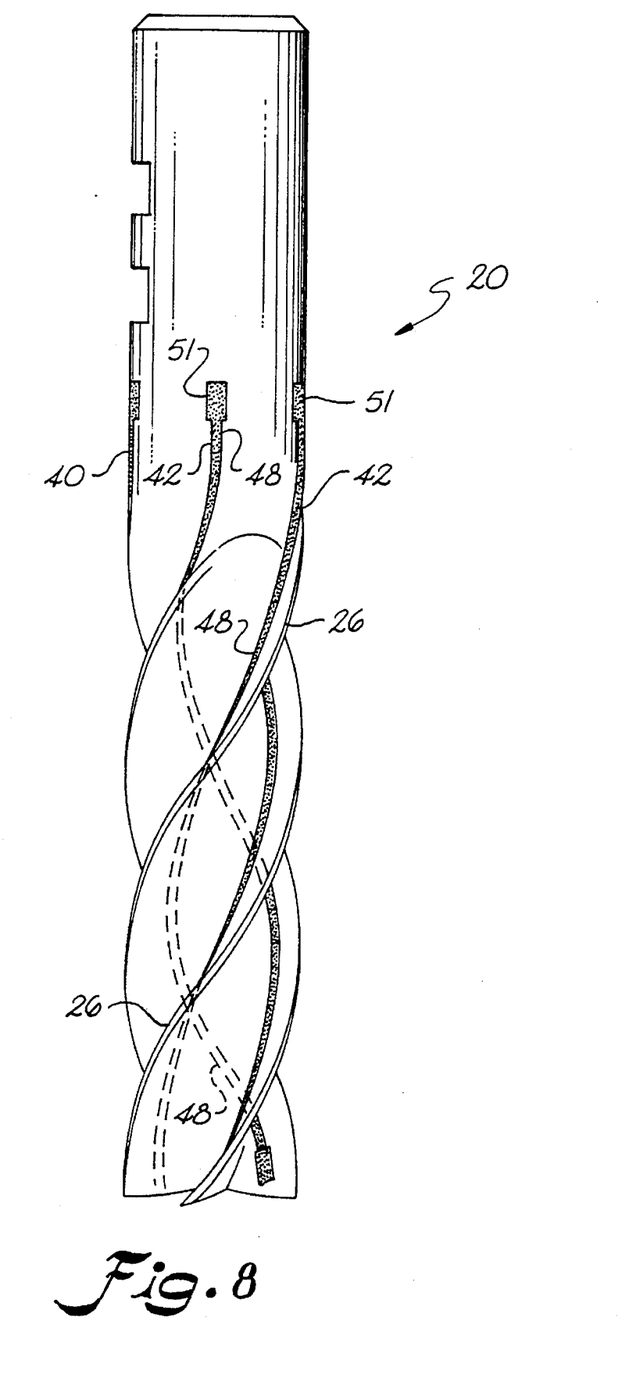
FIG. 8 is an illustration of an end mill incorporating a thin film thermocouple according to the invention.
Figure 9:
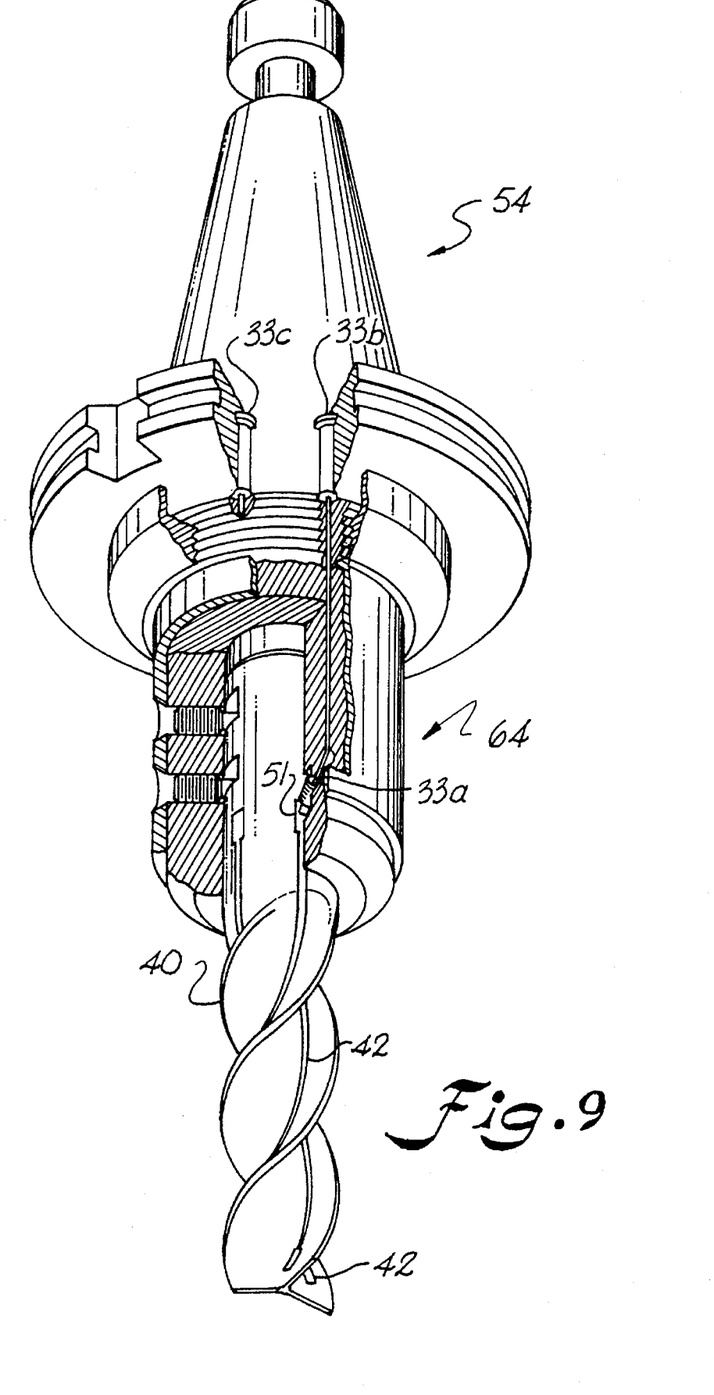
FIG. 9 is a partial cut-away illustration of the end mill shown in FIG. 8 incorporated with a tool holder particularly illustrating the electrical connections for the thermocouple device.
Figure 10:
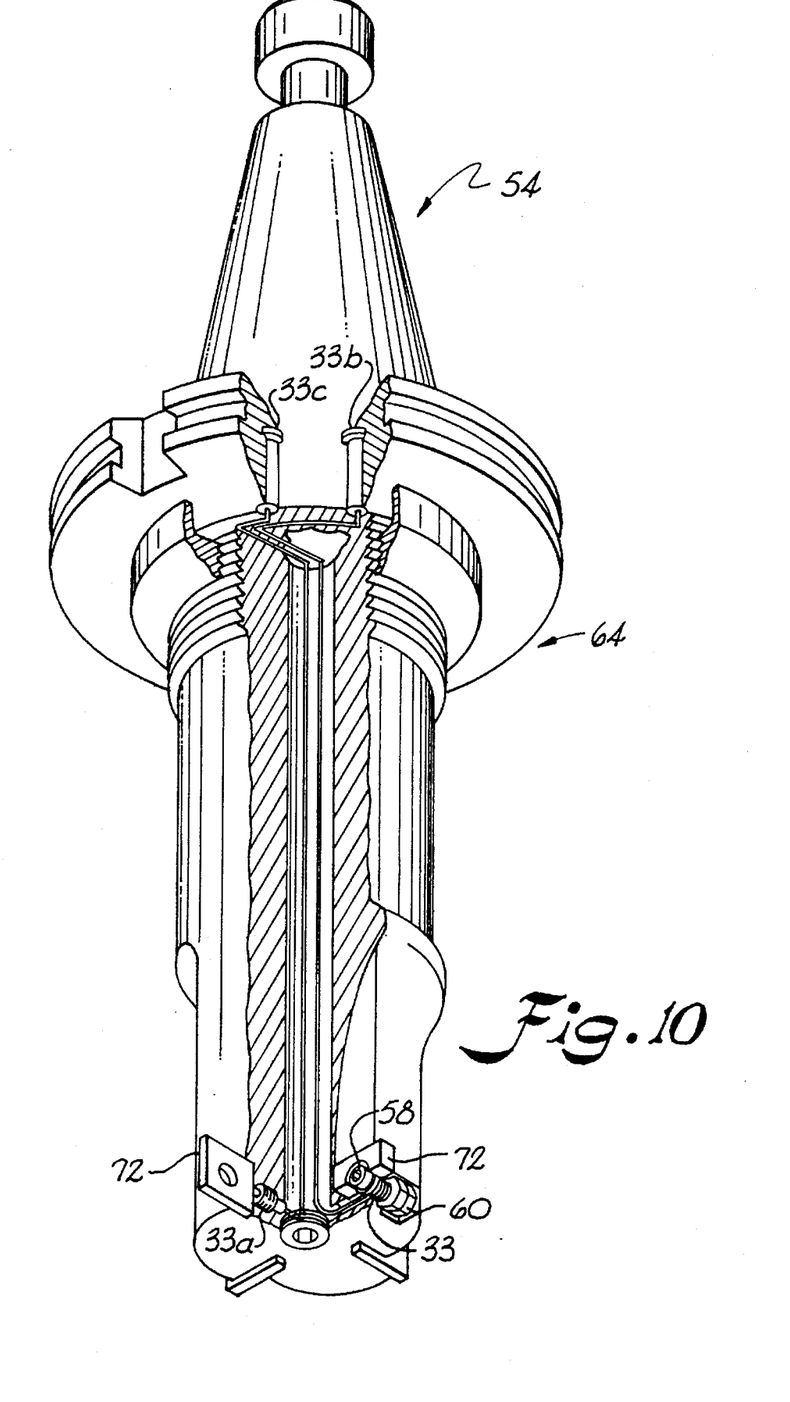
FIG. 10 is a partial cut-away view of an end mill with associated tool holder wherein the end mill incorporates cutting inserts according to the invention.

FIGS. 8 through 11 represent another preferred embodiment of the invention. In FIG. 8, a conventional end mill 40 is illustrated with thermocouples 42 formed thereon according to the invention. The thermocouples are set back a distance from the cutting or working edge 26 of the end mill. In this embodiment, the thermocouples 42 are formed as thin strips along the flutes of the end mill. As discussed, thermocouples 42 would be encapsulated in a protective coating 28 (not shown). In this embodiment, contact points 51 are disposed generally on the hot spot above the working edges 26. FIG. 9 illustrates the end mill of FIG. 8 inserted into a tool holder 54 for insertion into a milling machine. The operation of such a tool holder is well understood by those in the art. Pins 33 are provided for defining the electrical pathway from the thermocouples. A first pin 33a is provided and disposed so as to directly contact point 51. Preferably, this pin is spring loaded. An electrical pathway is defined between this pin 33a and another pin 33b, as illustrated. Yet another pin 33c is disposed so as to contact the conductive base 44, which could be the base body of the end mill 40. Alternatively, this pick-up pin 33c may contact another part of the structure of the spindle or tool holder 54 which is in contact with the base body of end mill 40 and preferably formed of the same material thereas. FIG. 10 illustrates another preferred embodiment of the present invention incorporated with a milling machine utilizing replaceable inserts 72.

It should be understood that the invention relates to any machine tool having a working member designed for cutting or boring through a work piece wherein heat is generated in the working member during the processing of the work piece. For example, in the embodiments wherein the invention is depicted as a milling machine or lathe, working member 64 constitutes insert 72, cutting tool 20, or end mill 40 which engages a work piece. Working member 64 obviously may also include whatever supporting members or devices which are necessary to drive the cutting tool, insert, or end mill. Thus, the working member should be considered as generic to any manner of tool which may incorporate the invention.

Referring again to FIG. 10, contact pins 33a and 33b are provided and disposed so as to provide an electrical connection for the pick up of the thermocouple defined on cutting insert 72. Pin 33c, nut 60 and locking screw 58 provide the electrical connection for the conductive base body of insert 72. The dashed lines in the figure indicate the electrical connection, which may be hard wired or otherwise configured.

Figure 11:
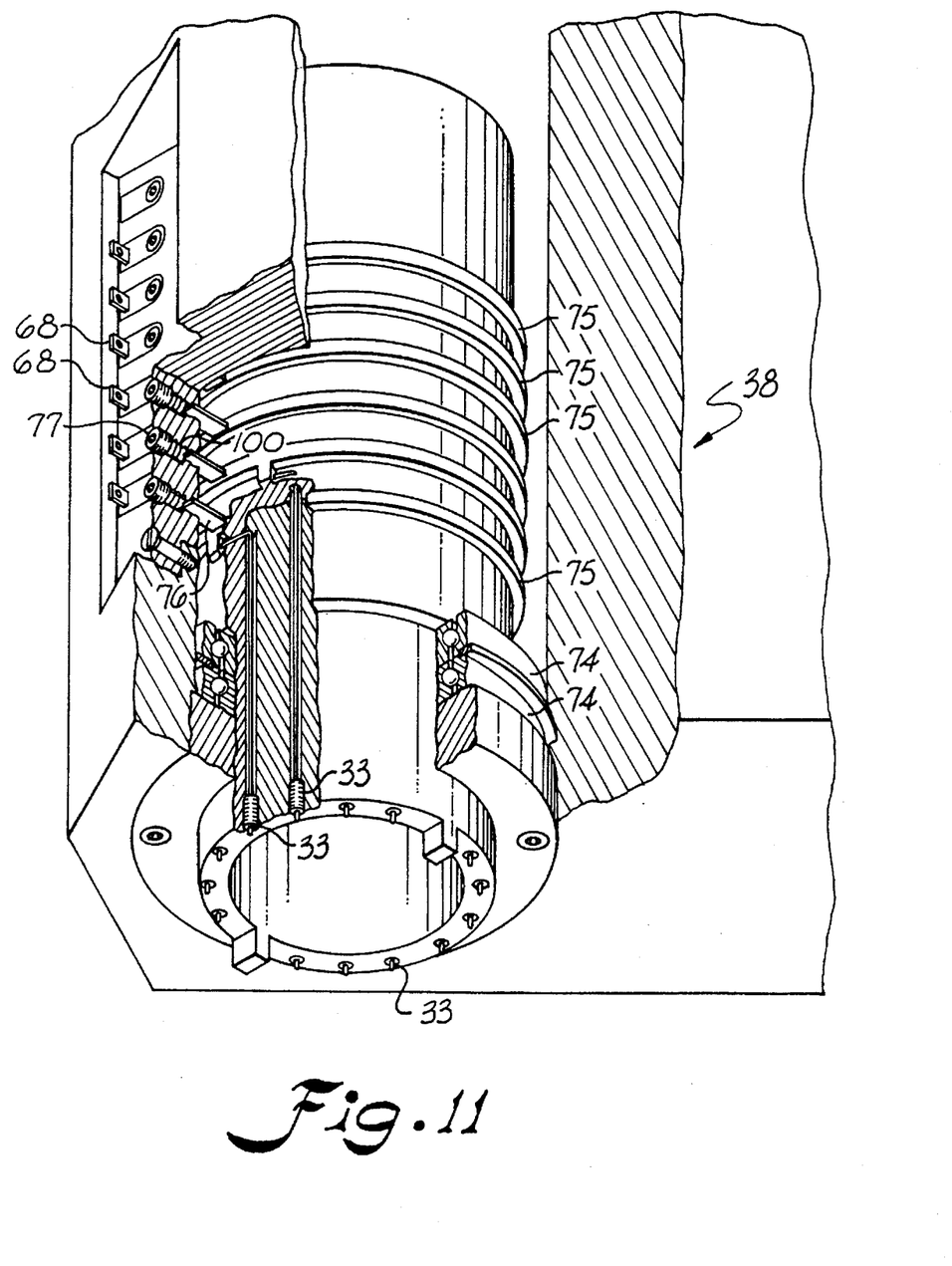
FIG. 11 is a partial cut-away view of the relevant components of a milling machine within which the tool holder of FIGS. 9 and 10 is inserted and particularly illustrates the electrical connections between the rotating tool holder and stationary milling machine.

FIG. 11 is an illustration of the driving apparatus (spindle) portion of a conventional milling machine and particularly illustrates how such a machine may be configured to accommodate the tool holders illustrated in FIGS. 9 and 10. It should be understood that this is a mere illustration of one means of accomplishing the required electrical connections. Any manner of various modifications and variations could be made to accommodate the required electrical connections, and all are within the scope and spirit of the invention. In FIG. 11, spindle bearings 74 are provided for rotatingly supporting the driven spindle. Contact slip rings are defined on the rotating spindle. Each contact slip ring is in electrical communication with a contact pin 33, as particularly illustrated in the cut-away section of the figure. Each slip ring is contacted by a brush 76 or other suitable contacting device which is fixed by way of springs 100 and set screws 77. Contact points 68 are provided for connection to circuits which are in communication with the conversion device, such as a computer. In this manner, a continuous electrical connection is essentially maintained with the thermocouples defined on the working member 64, such as inserts 72 or end mill 40.

It will be apparent to those skilled in the art that various modifications and variations can be made in the apparatus of the present invention without departing from the scope or spirit of the invention. For example, the invention can be applied to achieve the advantages afforded by direct and fast temperature response of a cutting tool in any manner of conventional tools or other similar devices, such as a press machine, boring machines, routers, wood working machines such as saws, etc. Thus, it is intended that the present invention cover the modifications and variations in this invention provided they come within the scope of the appended claims and their equivalence.

What is claimed is:

1. A direct temperature sensing cutting tool for use with a machine tool, said cutting tool directly sensing and providing feedback of the temperature of its cutting environment, said cutting tool comprising:

a base body, said base body defining at least one cutting edge of said cutting tool;

at least a first protective coating generally surrounding said base body, said protective coating providing a friction reducing surface for said cutting tool;

at least one thin film temperature sensing device disposed on said base body at a distance from said cutting edge, said temperature sensing device being encapsulated within said protective coating;

an electrical connection defined through said protective coating in electrical communication with said temperature sensing device, and wherein said cutting tool is configurable with said machine tool so that said temperature sensing device is in communication with a conversion device of said machine tool, the conversion device converting an electrical signal from said temperature sensing device to a readable temperature indication of the temperature sensed by said temperature sensing device.

2. The cutting tool as in claim 1, wherein said cutting tool comprises a cutting insert for use with a lathe.

3. The cutting tool as in claim 1, wherein said cutting tool comprises a cutting insert for use with a milling machine.

4. The cutting tool as in claim 1, wherein said cutting tool comprises an end mill for use with a milling machine.

5. The cutting tool as in claim 1, wherein said cutting tool comprises a drill bit for use with a drilling machine.

6. The cutting tool as in claim 1, wherein said cutting tool comprises a wood-working tool for use with a wood working machine.

7. The cutting tool as in claim 1, wherein said cutting tool comprises a plurality of cutting edges, said temperature sensing device disposed so as to detect the temperature at the hottest part of said base body regardless of which said cutting edge is utilized.

8. The cutting tool as in claim 1, comprising a plurality of said temperature sensing devices.

9. The cutting tool as in claim 1, wherein said temperature sensing device comprises a semi conducting temperature sensor.

10. The cutting tool as in claim 1, wherein said temperature sensing device comprises a resistance temperature device sensor.

11. The cutting tool as in claim 1, wherein said temperature sensing device comprises a thin film thermocouple.

12. The cutting tool as in claim 11, wherein said thin film thermocouple comprises a conductive base, an insulating film formed over said conductive base, a conductive metal film formed over said insulating film, and a thermocouple junction defined through said insulating film between said conductive base and said conductive metal film, said protective coating comprising an electrically insulating material disposed over said conductive metal film.

13. The cutting tool as in claim 12, wherein said base body is formed of a conductive metal and comprises said conductive base.

14. The cutting tool as in claim 12, wherein said base body is formed of a non-conductive material, said conductive base comprising a metal coating over said non-conductive base body.

15. The cutting tool as in claim 12, wherein said protective coating also covers said at least one cutting edge.

16. The cutting tool as in claim 12, further comprising a second protective coating covering said electrically insulating protective coating.

17. The cutting tool as in claim 12, wherein said cutting tool comprises a cutting insert having a plurality of cutting edges, said base body comprising a first face, said thermocouple defined in a section of said first face, said electrical connection comprising a first contact point defined through said protective coating to said conductive metal film and a second contact point to said conductive base.

18. The cutting tool as in claim 17, wherein said cutting tool is configured to be held in a tool holder of said machine tool, said contact point to said conductive base comprising a securing device configured to secure said cutting tool to said tool holder.

19. The cutting tool as in claim 18, wherein said securing device comprises a locking screw and nut.

20. The cutting tool as in claim 17, wherein said base body comprises a second face opposite said first face, said cutting tool comprising an additional thermocouple defined in a section of said second face.

21. The cutting tool as in claim 11, wherein said thermocouple is from 1 to 6 microns thick.

22. The cutting tool as in claim 11, wherein said thermocouple is a refractory metal thermocouple.

23. The cutting tool as in claim 11, further comprising a plurality of said thermocouples disposed on said cutting tool, said thermocouples being individually encapsulated in said protective coating.

24. The cutting tool as in claim 1, wherein said protective coating is a ceramic coating.

25. A machine tool, comprising:

at least one working member designed for cutting or boring through a work piece wherein heat is generated in said working member through friction between said working member and said work piece, said working member further comprising a direct temperature sensing device to measure the temperature of said working member, said direct temperature sensing device further comprising:

a base body, said base body defining at least one cutting edge of said working member;

an electrically insulating protective coating generally surrounding said base body, said protective coating providing a hard smooth friction reducing surface for said working member;

a thin film temperature sensing device disposed on said base body at a distance from said working edge, said temperature sensing device being encapsulated within said protective coating; and an electrical connection defined through said protective coating in electrical communication with said temperature sensing device;

said machine tool further comprising a computer in electrical communication with said temperature sensing device for converting electrical signals from said temperature sensing device into readable temperature indications.

26. The machine tool as in claim 25, wherein said temperature sensing device comprises a thin film thermocouple having a conductive base, an insulating film over said conductive base, a conductive metal film over said insulating film, and a thermocouple junction defined through said insulating film between said conductive base and said conductive metal film, said protective coating disposed over said conductive metal film, said electrical connection comprising a first contact point in electrical communication with said conductive metal film through said protective coating and a second contact point in electrical communication with said conductive base.

27. The machine tool as in claim 26, further comprising contact leads in electrical communication with said contact points, said first contact lead formed substantially of the same metal as said conductive metal film and said second contact lead formed substantially of the same metal as said conductive base.

28. The machine tool as in claim 26, wherein said working member comprises a replaceable cutting insert held in a tool holder device, said first and second contact points comprising contacting members between said cutting insert and said tool holder device.

29. The machine tool as in claim 28, wherein said cutting insert comprises a plurality of cutting edges, said cutting insert being variably positionable within said support member to use any one of said cutting edges, said electrical connection comprising a plurality of first contact points so that at least one of said first contact points is in electrical communication with one of said contacting member regardless of the position of said cutting insert within said support member.

30. The machine tool as in claim 26, wherein said machine tool is a milling machine and said working member comprises an end mill held in a rotating support member of said milling machine, said first and second contact points comprising stationary contacting members between said end mill and said support member and rotating contacting members between said support member and said machine tool.

31. The machine tool as in claim 25, further comprising a second protective coating covering said electrically insulating protective coating, said second protective coating also covering said cutting edge.

* * * * *